US005544077A

United States Patent [19]
Hershey

[11] Patent Number: 5,544,077
[45] Date of Patent: Aug. 6, 1996

[54] HIGH AVAILABILITY DATA PROCESSING SYSTEM AND METHOD USING FINITE STATE MACHINES

[75] Inventor: Paul C. Hershey, Manassas, Va.

[73] Assignee: International Business Machines Corporation, Armonk, N.Y.

[21] Appl. No.: 184,098

[22] Filed: Jan. 19, 1994

[51] Int. Cl.[6] .................................................. G06F 11/30
[52] U.S. Cl. ...................... 364/570; 364/550; 395/182.1; 395/182.09
[58] Field of Search .................................. 364/570, 736, 364/228.3, 550, 579, 580; 307/113; 370/84, 109, 85.5, 825.06, 825.05, 825.36; 395/650, 183.17, 181, 182.01, 182.08, 182.09, 182.1; 371/11.2, 20.6; 375/54

[56] References Cited

U.S. PATENT DOCUMENTS

| 3,638,193 | 1/1972 | Opferman et al. | 307/113 |
|---|---|---|---|
| 3,806,647 | 4/1974 | Dohne et al. | 375/54 |
| 4,063,038 | 12/1977 | Kaul et al. | 370/84 |
| 4,162,480 | 7/1979 | Berlekamp | 364/736 |
| 4,227,245 | 10/1980 | Edbland et al. | 364/468 |
| 4,458,309 | 7/1984 | Wilder, Jr. | 395/575 |
| 4,459,656 | 7/1984 | Wilder, Jr. | 395/550 |
| 4,466,098 | 8/1984 | Southard | 395/182.1 |
| 4,521,849 | 6/1985 | Wilder, Jr. | 395/575 |
| 4,543,630 | 9/1985 | Neches | 364/228.3 |
| 4,660,196 | 4/1987 | Gray et al. | 370/109 |
| 4,709,365 | 11/1987 | Beale et al. | 371/11.2 |
| 4,779,194 | 10/1988 | Jennings et al. | 395/650 |
| 4,805,089 | 2/1989 | Lane et al. | 364/188 |
| 4,851,998 | 7/1989 | Hospodor | 364/580 |
| 4,905,171 | 2/1990 | Kiel et al. | 364/551.01 |
| 4,939,724 | 7/1990 | Ebersole | 370/85.15 |
| 4,944,038 | 7/1990 | Hardy et al. | 370/85.5 |
| 4,958,273 | 9/1990 | Anderson et al. | 395/182.09 |
| 4,980,824 | 12/1990 | Tulpule et al. | 395/650 |
| 5,035,302 | 7/1991 | Thangavelu | 187/382 |
| 5,062,055 | 10/1991 | Chinnaswamy et al. | 364/551.01 |
| 5,067,107 | 11/1991 | Wade | 395/500 |
| 5,072,376 | 12/1991 | Ellsworth | 395/650 |
| 5,077,763 | 12/1991 | Gagnoud et al. | 377/16 |
| 5,079,760 | 1/1992 | Nemirovsky et al. | 370/17 |
| 5,084,871 | 1/1992 | Carn et al. | 370/94.1 |
| 5,132,962 | 7/1992 | Hobgood et al. | 371/20.6 |
| 5,220,668 | 6/1993 | Bullis | 395/650 |
| 5,237,677 | 8/1993 | Hirosawa et al. | 395/275 |
| 5,307,481 | 4/1994 | Shimazaki et al. | 395/182.09 |
| 5,365,514 | 11/1994 | Hershey et al. | 371/20.6 |
| 5,375,070 | 12/1994 | Hershey et al. | 364/550 |
| 5,390,326 | 2/1995 | Shah | 371/20.6 |
| 5,406,504 | 4/1995 | Denisco et al. | 364/580 |
| 5,428,745 | 6/1995 | deBruijn et al. | 395/200 |
| 5,432,715 | 7/1995 | Shigematsu et al. | 364/551.01 |
| 5,434,998 | 7/1995 | Akai et al. | 395/182.09 |

FOREIGN PATENT DOCUMENTS

61-53855  3/1986  Japan .

Primary Examiner—Emanuel T. Voeltz
Assistant Examiner—Hal D. Wachsman
Attorney, Agent, or Firm—John D. Flynn; John E. Hoel

[57] ABSTRACT

The invention is a high availability data processing system. It includes a primary processor at a first node of a communications network with a serial data stream, having failure detection logic therein, for outputting an alarm signal to the network having a characteristic pattern indicating a failure in the primary processor. The invention further includes a first standby processor at a second node of the communications network, having a first event driven interface therein coupled to the network, for detecting the alarm signal. When the characteristic pattern is detected by the event driven interface, switch over logic in the first standby processor, invokes primary status in the first standby processor.

5 Claims, 9 Drawing Sheets

FIG. 1A

ABORT FORMAT

FIG. 1B

TOKEN FORMAT

FIG. 1C

FRAME FORMAT

FIG. 2A

REGULAR EXPRESSION ($R_{1BEAC}$) = [(JK0)*(JK0JK000) (000+001+010+011+100+101+110+111)(1)
(0000+0001+0010+0011+0100+0101+0110+0111+1000+1001+1010+1011+1100+1101+1110+1111)
(00)
(0000+0001+0010+0011+0100+0101+0110+0111+1000+1001+1010+1011+1100+1101+1110+1111)
(1)(0)(0+1)*(JK1JK1)]*

FIG. 2
STATE DIAGRAM
FOR BEACON FSM

FIG. 3

STATE TABLE FOR BEACON FSM

| PS | NEXT STATE VS INPUT | | | | OUTPUT $\omega_{BEAC}$ |
| --- | --- | --- | --- | --- | --- |
| | J | K | 0 | 1 | |
| S0 | S1 | S0 | S0 | S0 | 0 |
| S1 | S1 | S2 | S0 | S0 | 0 |
| S2 | S1 | S0 | S3 | S0 | 0 |
| S3 | S4 | S0 | S0 | S0 | 0 |
| S4 | S1 | S5 | S0 | S0 | 0 |
| S5 | S1 | S0 | S6 | S0 | 0 |
| S6 | S4 | S0 | S7 | S0 | 0 |
| S7 | S1 | S0 | S8 | S0 | 0 |
| S8 | S1 | S0 | S9 | S9 | 0 |
| S9 | S1 | S0 | S10 | S10 | 0 |
| S10 | S1 | S0 | S11 | S11 | 0 |
| S11 | S1 | S0 | S0 | S12 | 0 |
| S12 | S1 | S0 | S13 | S13 | 0 |
| S13 | S1 | S0 | S14 | S14 | 0 |
| S14 | S1 | S0 | S15 | S15 | 0 |
| S15 | S1 | S0 | S16 | S16 | 0 |
| S16 | S1 | S0 | S17 | S0 | 0 |
| S17 | S1 | S0 | S18 | S0 | 0 |
| S18 | S1 | S0 | S19 | S19 | 0 |
| S19 | S1 | S0 | S20 | S20 | 0 |
| S20 | S1 | S0 | S21 | S21 | 0 |
| S21 | S1 | S0 | S22 | S22 | 0 |
| S22 | S1 | S0 | S0 | S23 | 0 |
| S23 | S1 | S0 | S24 | S0 | 0 |
| S24 | S1 | S0 | S25 | S25 | 0 |
| S25 | S26 | S0 | S25 | S25 | 0 |
| S26 | S1 | 27 | S0 | S0 | 0 |
| S27 | S1 | S0 | S3 | S28 | 0 |
| S28 | S29 | S0 | S0 | S0 | 0 |
| S29 | S1 | 30 | S0 | S0 | 0 |
| S30 | S1 | S0 | S3 | S31 | 0 |
| S31 | S1 | S0 | S0 | S0 | 1 |

FIG. 4

PRIMARY WORK STATION (RS6000)

FIG. 5
ARCHITECTURE FOR EDI
TO CORRECT ERRORS

HIGH AVAILABILITY DATA PROCESSING SYSTEM AND METHOD USING FINITE STATE MACHINES

BACKGROUND OF THE INVENTION

1. Technical Field

The invention disclosed broadly relates to data processing systems and more particularly relates to a system and method for high availability data processing, using finite state machines.

2. Related Patent Applications

This patent application is related to the copending U.S. patent application Ser. No. 08/024,572, filed Mar. 1, 1993, entitled "Information Collection Architecture and Method for a Data Communications Network," by J. G. Waclawsky, Paul C. Hershey, Kenneth J. Barker and Charles S. Lingafelt, Sr., assigned to the IBM Corporation and incorporated herein by reference. Now U.S. Pat. No. 5,375,070.

This patent application is also related to the copending U.S. patent application, Ser. No. 08/024,563, filed Mar. 1, 1993, entitled "Event Driven Interface for a System for Monitoring and Controlling a Data Communications Network," by Paul C. Hershey, John G. Waclawsky, Kenneth J. Barker and Charles S. Lingafelt, Sr., assigned to the IBM Corporation and incorporated herein by reference. Now U.S. Pat. No. 5,365,514.

This patent application is also related to the copending U.S. patent application, Ser. No. 08/024,542, filed Mar. 1, 1993, entitled "System and Method for Configuring an Event Driven Interface and Analyzing Its output for Monitoring and Controlling a Data Communications Network," by John G. Waclawsky and Paul C. Hershey, assigned to the IBM Corporation and incorporated herein by reference. Now U.S. Pat. No. 5,493,689.

This patent application is also related to the copending U.S. patent application, Ser. No. 08/138,045, filed Oct. 15, 1993, entitled "System and Method for Adaptive, Active Monitoring of a Serial Data Stream having a Characteristic Pattern," by Paul C. Hershey and John G. Waclawsky, assigned to the IBM Corporation and incorporated herein by reference.

3. Background Art

Finite state machines (FSM) are commonly used in the implementation of telecommunications protocols and of input/output processors, because finite state machines can define all possible conditions completely and unambiguously. However, a problem with finite state machines is defining the sequence of states and the accompanying actions to be accomplished with each state. Conventional implementations of finite state machines result in program code sets which are extensive and complex. This problem has been solved by the "System and Method for Adaptive, Active Monitoring of a Serial Data Stream having a Characteristic Pattern," by Paul C. Hershey, et al., cited above. The adaptive, active monitor comprises finite state machines (FSM) which are constructed to detect the occurrence of a characteristic data pattern in a bit stream. If the FSM successfully detects the pattern, it then outputs a pattern alarm signal, indicating the successful detection of the characteristic data pattern.

One feature of the adaptive, active monitor invention is the programmability of the finite state machines (FSMs) and the programmability of their interconnection. Each FSM consists of an address register and a memory. The address register has two portions, an n-X bit wide first portion and a X-bit wide second portion. X is one bit for binary data, X is a word of two bits for Manchester encoded data, or X is a word of five bits for FDDI encoded data. The X-bit wide portion is connected to the input data stream which contains the characteristic data pattern of interest. The n-X bit wide portion contains data which is output from the memory. The next address to be applied by the address register to the memory is made up of the n-X bit wide portion and the next arriving X-bit word from the input data stream.

Each memory has a plurality of data storage locations, each having a first portion with n-X bits, to be output to the address register as part of the next address. Many of the memory locations have a second portion which stores a command to reset the address register if the FSM fails to detect its designated component bit pattern.

A terminal location in the memory of an FSM will include a start signal value to signal another FSM to start analyzing the data stream. If the terminal location in a predecessor FSM memory is successful in matching the last bit of its designated component bit pattern, then it will output a starting signal to a succeeding FSM. The succeeding FSM will begin analyzing the data stream for the next component bit pattern of the characteristic data pattern. The memory of an FSM can be a writable RAM, enabling its reconfiguration to detect different component bit patterns.

A long standing problem in data processing technology is the provision of highly reliable systems for continuous availability of the data processing resource. Redundant systems have been configured in the prior art, to provide a standby processor to take the place of a primary processor when the primary fails. Various techniques have been used to initiate the switchover of the standby processor. The standby may be running the same program as the primary, in synchronism with the primary, but the standby generates no output. The standby monitors a heartbeat signal from the primary, to periodically check the health of the primary. If the standby senses that the primary is failing, the standby will switchover to perform the functions of the primary, generating the output that had been generated by the primary. The control of the switchover can be initiated by the standby signalling the primary to stop, while the standby takes over the primary's functions. This is known as a hot-standby configuration.

The problem with this prior art approach to high availability, is that the control of the monitoring of the heartbeat and the switchover is done by a sequence of programmed instructions. The execution of the programmed instructions takes time, and therefore the switchover action must wait until the monitoring program completes its execution and issues the control signal to begin the switchover operation. The prior art hot-standby configurations are not sufficiently fast to permit high speed, high availability data processing in critical applications.

OBJECTS OF THE INVENTION

It is therefore an object of the invention to increase the speed of detection of a characteristic failure data pattern from the primary processor, to obtain effective, realtime control for high speed, hot-standby data processing systems.

It is another object of the invention to provide high speed, programmable finite state machines to detect characteristic failure data patterns from the primary processor.

It is another object of the invention to detect characteristic failure data patterns in a high speed data processing system.

SUMMARY OF THE INVENTION

The invention is a high availability data processing system. It includes a primary processor at a first node of a communications network with a serial data stream, having failure detection logic therein, for outputting an alarm signal to the network having a characteristic pattern indicating a failure in the primary processor.

The invention further includes a first standby processor at a second node of the communications network, having a first event driven interface therein coupled to the network, for detecting the alarm signal.

The invention further includes a first n-bit address register in the first event driven interface, having a first portion with n-x bits and a second portion with a plurality of x bits and an input of the second portion coupled to the serial stream, for receiving x-bit words from the serial data stream.

The invention further includes first addressable memory having a plurality of data storage locations, each having a first portion with n-x bits, the first memory having an n-bit address input coupled to an output of the first address register, the first memory configured with data stored in first and second ones of the data storage locations to represent a digital filter for the characteristic alarm pattern.

The invention further includes a feedback path from an output of the first memory to an input of the first register, for transferring the data from the first one of the data storage locations in the first memory to the first portion of the first address register, for concatenation with the x-bit words from the serial data stream to form an address for the second one of the data storage locations of the first memory.

The invention further includes the second one of the data storage locations of the first memory having a switch over signal value stored therein, which is output when the characteristic pattern is detected by the digital filter.

The invention further includes switch over logic in the first standby processor, coupled to the second data storage location, for invoking primary status in the first standby processor.

Further in accordance with the invention, it can include a second standby processor at a third node of the communications network, having a second event driven interface therein coupled to the network, for detecting the alarm signal.

The invention further includes a second n-bit address register in the second event driven interface, having a first portion with n-x bits and a second portion with a plurality of x bits and an input of the second portion thereof coupled to the serial stream, for receiving x-bit words from the serial data stream.

The invention further includes second addressable memory having a plurality of data storage locations, each having a first portion with n-x bits, the second memory having an n-bit address input coupled to an output of the second address register, the second memory configured with data stored in first and second ones of the data storage locations therein to represent a digital filter for the characteristic alarm pattern.

The invention further includes a feedback path from an output of the second memory to an input of the second register, for transferring the data from the first one of the data storage locations in the second memory to the first portion of the second address register, for concatenation with the x-bit words from the serial data stream to form an address for the second one of the data storage locations of the second memory.

The invention further includes the second one of the data storage locations of the second memory having a standby activation signal value stored therein, which is output when the characteristic pattern is detected by the digital filter thereof.

The invention further includes activation logic in the second standby processor, coupled to the second data storage location in the second memory, for invoking hot standby status in the second standby processor.

Further in accordance with the invention, the primary processor includes a system bus coupled to a data processing element that outputs a failure signal to the system bus having a second characteristic pattern, indicating a failure in the data processing.

The invention further includes the primary processor having a second event driven interface therein coupled to the system bus, for detecting the failure signal.

The invention further includes a second n-bit address register in the second event driven interface, having a first portion with n-x bits and a second portion with a plurality of x bits and an input of the second portion thereof coupled to the system bus, for receiving x-bit words from the system bus.

The invention further includes second addressable memory having a plurality of data storage locations, each having a first portion with n-x bits, the second memory having an n-bit address input coupled to an output of the second address register, the second memory configured with data stored in first and second ones of the data storage locations therein to represent a digital filter for the second characteristic failure pattern.

The invention further includes a feedback path from an output of the second memory to an input of the second register, for transferring the data from the first one of the data storage locations in the second memory to the first portion of the second address register, for concatenation with the x-bit words from the serial data stream to form an address for the second one of the data storage locations of the second memory.

The invention further includes the second one of the data storage locations of the second memory having a failure detection signal value stored therein, which is output when the second characteristic pattern is detected by the digital filter thereof.

The invention further includes the failure detection logic in the primary processor, coupled to the second data storage location in the second memory, for transmitting the alarm signal to the network, in response to the failure detection signal value.

The invention can further include failure correction logic in the primary processor, coupled to the second data storage location in the second memory, for generating correction signals in response to the failure detection signal value, for correcting the failure in the data processing element.

DESCRIPTION OF THE FIGURES

These and other objects, features and advantages will be more fully appreciated with reference to the accompanying figures.

DISCUSSION OF THE PREFERRED EMBODIMENT

The invention is a high availability data processing system. It includes a primary processor at a first node of a communications network with a serial data stream, having failure detection logic therein, for outputting an alarm signal to the network having a characteristic pattern indicating a failure in the primary processor. The invention further includes a first standby processor at a second node of the communications network, having a first event driven interface therein coupled to the network, for detecting the alarm signal. When the characteristic pattern is detected by the event driven interface, switch over logic in the first standby processor, invokes primary status in the first standby processor.

Characteristic Pattern for a Fault Example (Network—Beacon)

In this section we present an example of a failure detection capability for a characteristic pattern that indicates a failure on an IEEE 802.5 token ring network (1). For the IEEE 802.5 protocol, the data includes LLC frame data and MAC frame data. LLC frame data includes user data, source and destination addresses, and control field overhead. MAC frame data includes data that control the operation of the token ring network and any ring station operations that affects the ring. Such data are required while the network is preparing to transmit data. Examples of MAC frames include nearest neighbor notification and beacons.

Figure 1A:
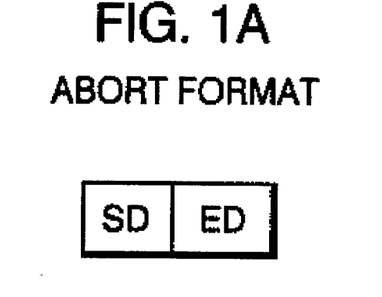
FIGS. 1A, 1B and 1C show three of the basic formats used in token rings; namely, abort, token, and frame.
Figure 1B:
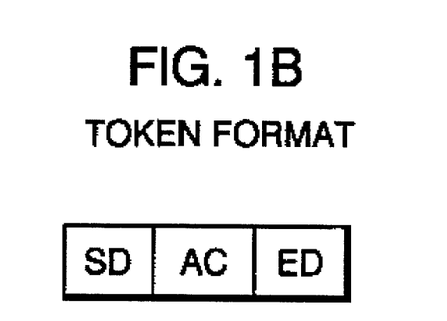
Figure 1C:
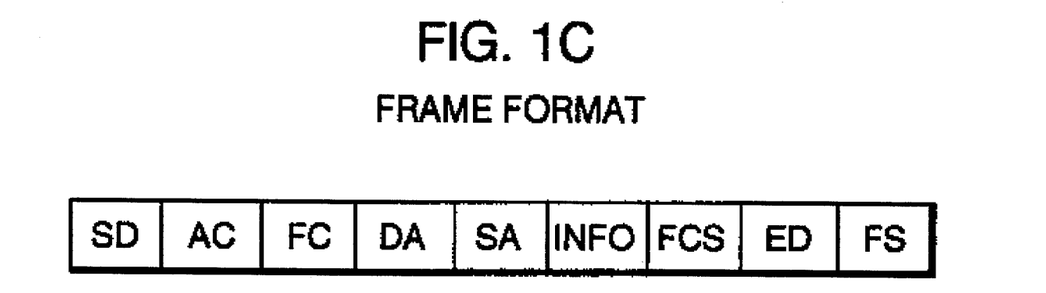

The IEEE 802.5 token ring standard includes 4 channel symbols {J, K, 0, 1} (2). Unique strings of these symbols compose three of the basic formats used in token rings; namely, abort, token, and frame. We show these formats in FIGS. 1A, 1B, and 1C. The following notation is used to delineate the fields within these formats: SD denotes the starting delimiter (comprising 1 octet), AC denotes the access control field (comprising 1 octet), FC denotes the frame control field (comprising 1 octet), DA denotes the destination address (comprising 2 or 6 octets), SA denotes the source address (comprising 2 or 6 octets), INFO denotes the information field (comprising between 0 and 17800 octets \cite{Tokarch '89}), FCS denotes the frame check sequence field (comprising 4 octets), ED denotes the ending delimiter (comprising 1 octet), and FS denotes the frame status field (comprising 1 octet).

By detecting specific strings of channel symbols within these fields, one can identify characteristic patterns indicating a failure on the token ring network. For example, a hard fault is a permanent fault that causes the token ring to stop operating within the normal token ring protocol. Examples of hard faults include a broken cable or a jabbering station (2). A ring station downstream from the hard fault recognizes a hard error and transmits a Beacon MAC frame. A Beacon MAC frame identifies the beaconing ring station's nearest active upstream neighbor (NAUN) and the type of error detected.

When the beaconing ring station's NAUN has copied eight Beacon MAC frames, the NAUN removes itself from the ring and tests itself and the ring (1). If the test is successful, the NAUN reattaches itself to the ring. If the test fails, the NAUN notifies the LAN manager. If the ring does not recover after a specified period of time, the beaconing station assumes that its NAUN has completed self-test, and the beaconing station removes itself from the ring for self-test. If the test is successful, the beaconing station attaches itself back to the ring. If the test fails, the beaconing station notifies the LAN manager. If the ring still does not recover, the error cannot be corrected automatically, and manual intervention is required.

Figure 2:
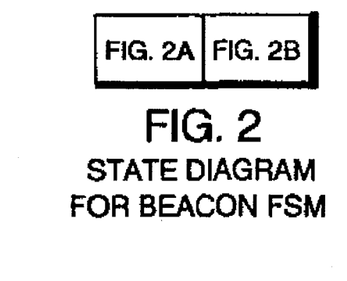
FIGS. 2, 2A and 2B depict is the state diagram and regular expression that recognizes a Beacon MAC frame for the IEEE 802.5 token ring protocol.
Figure 2A:
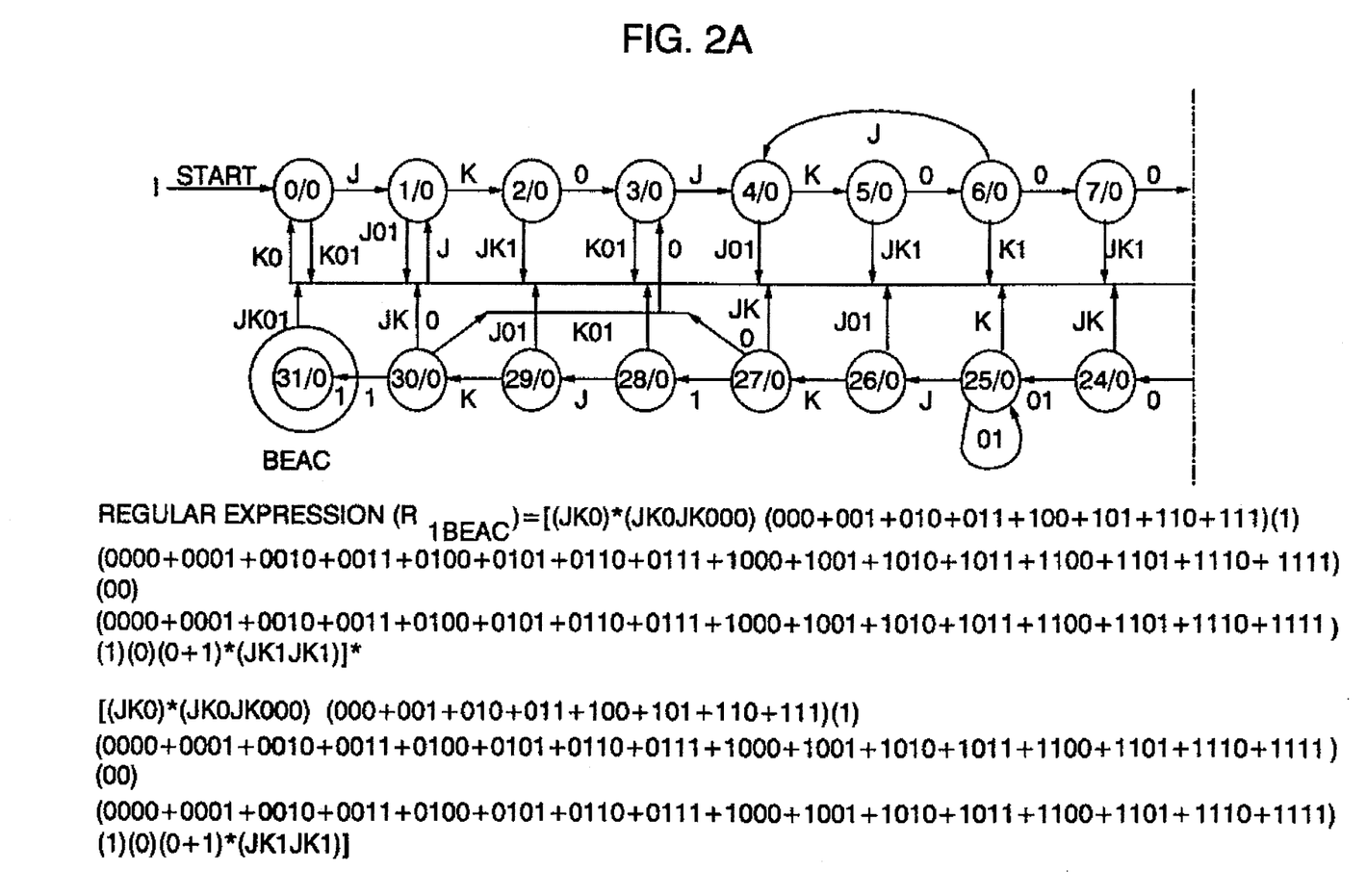
Figure 2B:
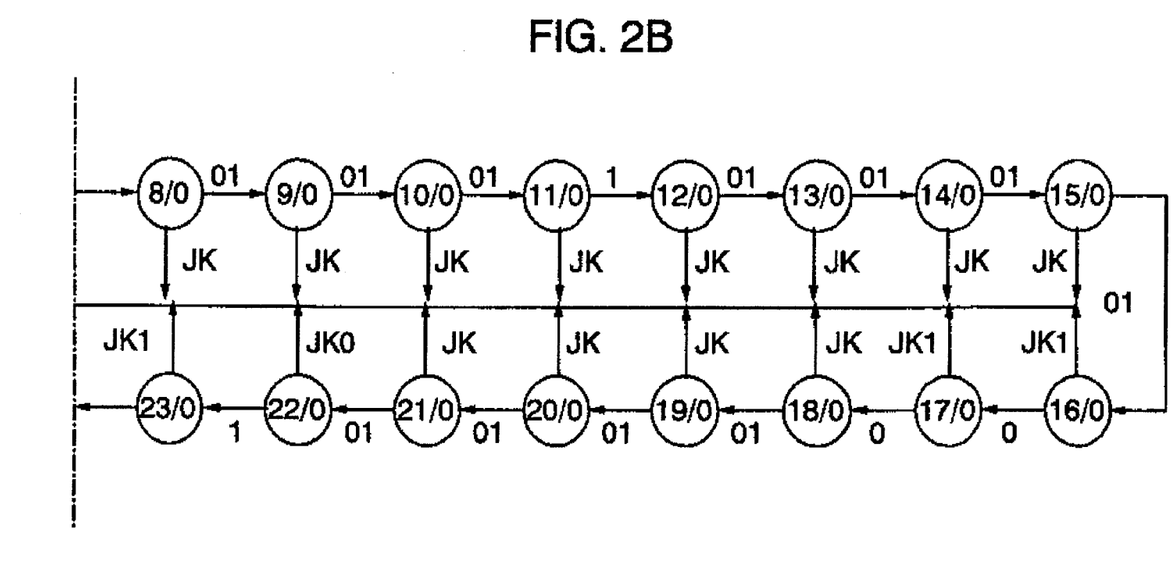
Figure 3:
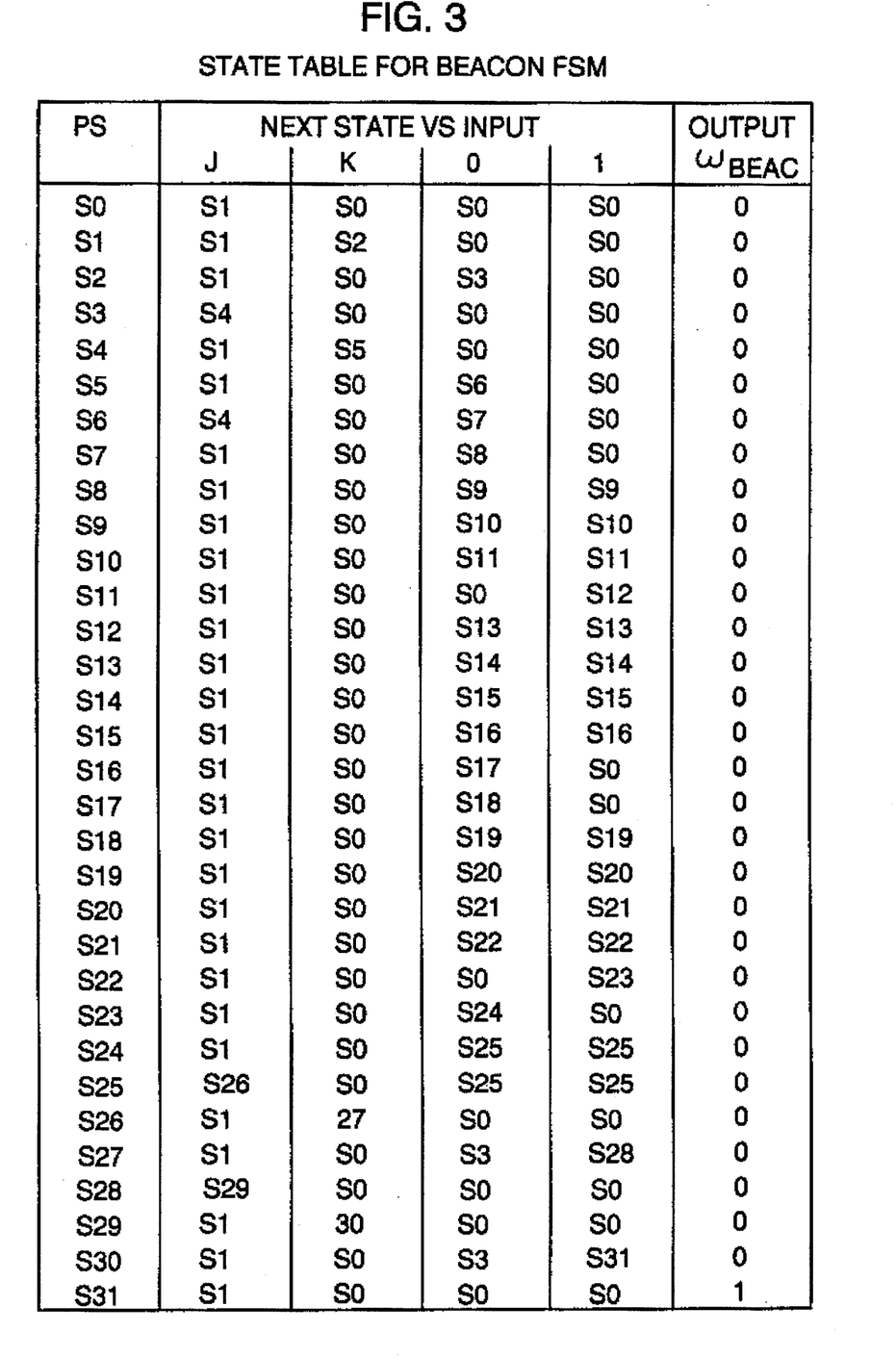
FIG. 3 shows the corresponding state table for a Beacon MAC frame.

The event driven interface (also referred to as the ICA) detects the characteristic pattern for a Beacon MAC frame. In FIGS. 2A and 2B we present the state diagram and regular expression that recognizes a Beacon MAC frame for the IEEE 802.5 token ring protocol. The regular expression identifies the specific channel symbol sequences that compose a Beacon MAC frame. A sequence (X) followed by a * {e.g., (JKO)*} describes the set of possible symbol sequences that can be formed by concatenating a finite number of strings of symbols from (X) (3). In FIG. 3 we present the corresponding state table for a Beacon MAC frame.

Characteristic Pattern for a Fault Example (System Buss)

In this section we present an example of a failure detection capability for a characteristic pattern that indicates a failure on the system bus of an RS6000 computer (4). An RS6000 computer implements the Micro Channel Architecture. This architecture includes a system bus called the Micro Channel. The Micro Channel consists of a data bus, an address bus, an arbitration bus, a set of interrupts, and support signals. Micro Channel participants are either masters or slaves. A master drives the address bus and data transfer control signals that cause data transfer to or from a slave. A master can be a system master, bus master, or a DMA controller. A slave sends and receives data under the control of a master. A slave can be any adapter card.

An exception condition is an event that disrupts the normal processing by a master. Exception conditions include: channel data and address parity exceptions, channel non-parity exceptions, master and slave dependent exceptions, catastrophic exceptions, and channel-timeout exceptions.

Figure 4:
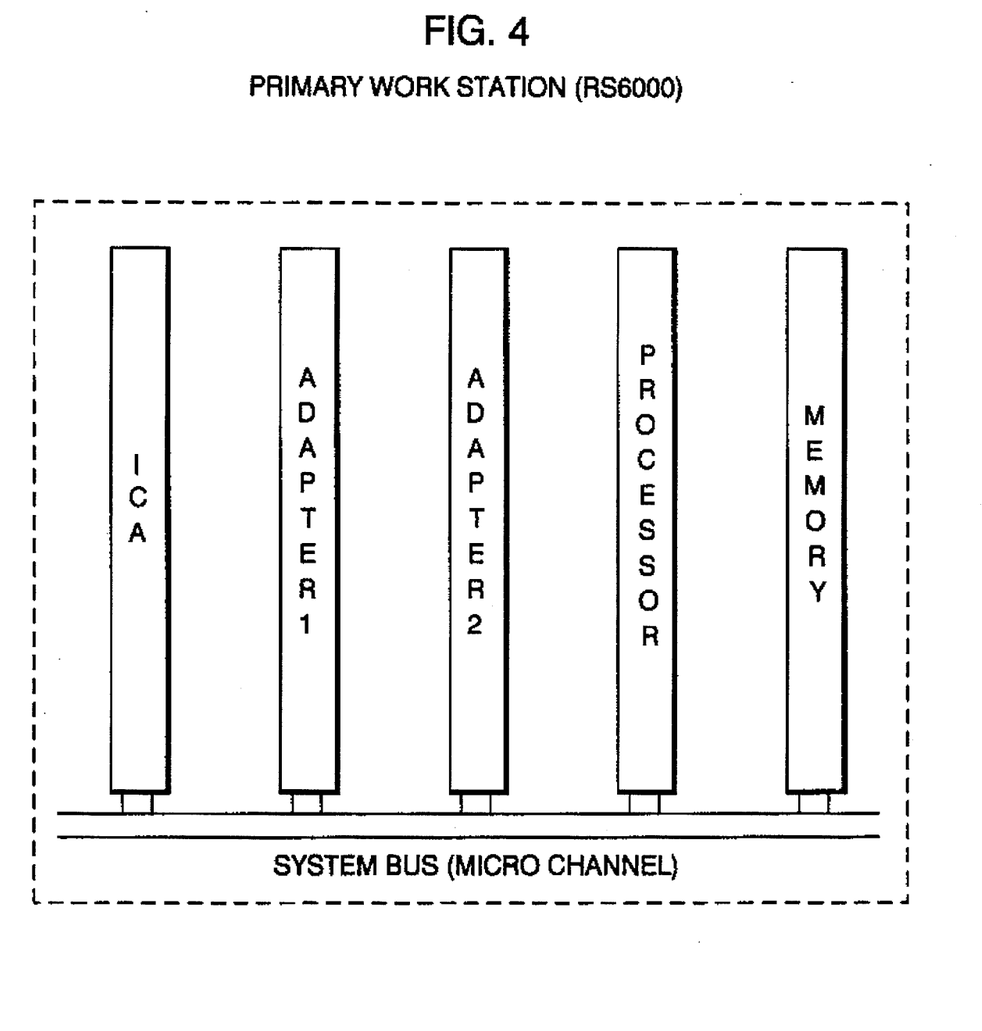
FIG. 4 shows a configuration of adapters for an RS6000 computer that serves as the primary work station.

A master reports exceptions with an interrupt and termination of bus ownership. A slave or channel monitor reports exceptions by activating a synchronous —CHCK signal. If —CHCK is activated, the system master or a bus master suspends processing and generates an interrupt. The interrupt invokes a utility program to handle the exception condition. In order to activate —CHCK, a slave sets bit 7 of POS register 5 to a 0. This indicates the source of the exception in all cases except address parity errors. The ICA device can detect bit 7 of POS register 5 and issue an alarm instantaneously. This alarm can invoke the utility program to handle the exception condition. Therefore, the ICA can replace the exception handling function of the master with a real-time capability. A possible configuration of adapters for an RS6000 computer that serves as the primary work station is shown in FIG. 4.

ICA for Fault Correction

Figure 5:
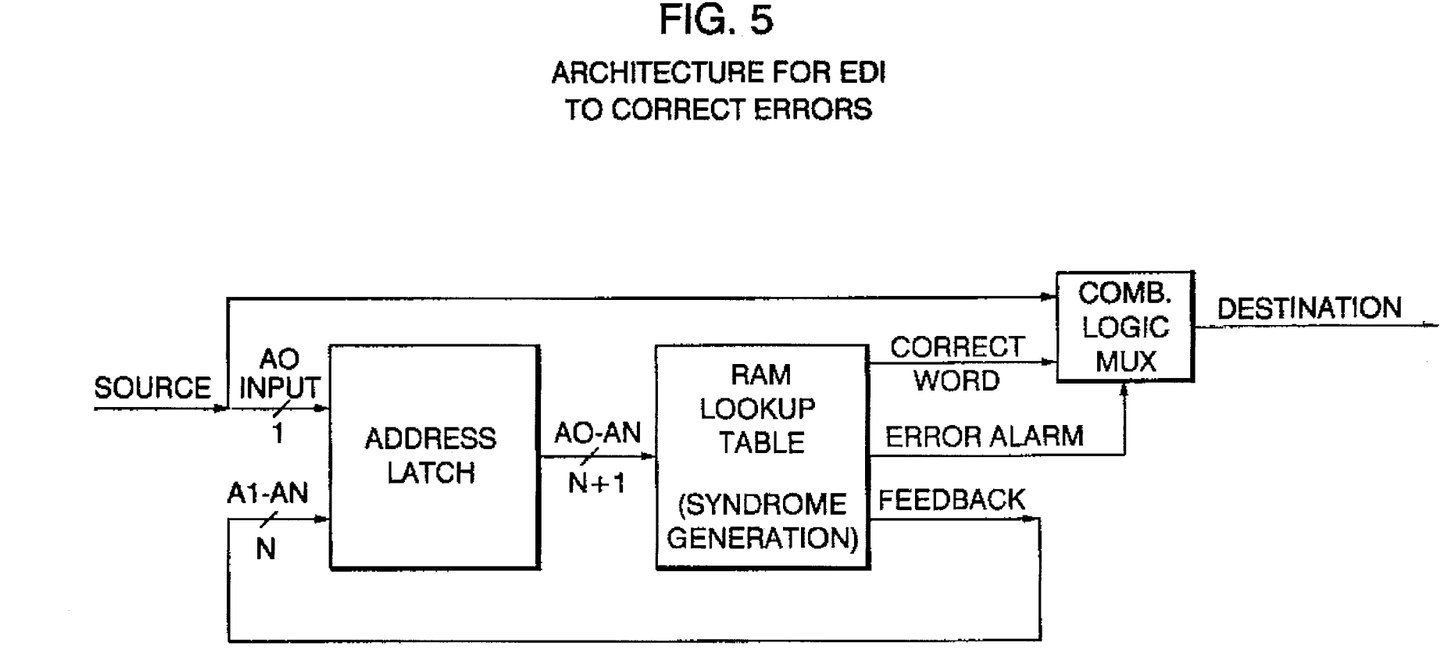
FIG. 5 shows the architecture for using the event driven interface (ICA) to correct errors.
Figure 6:
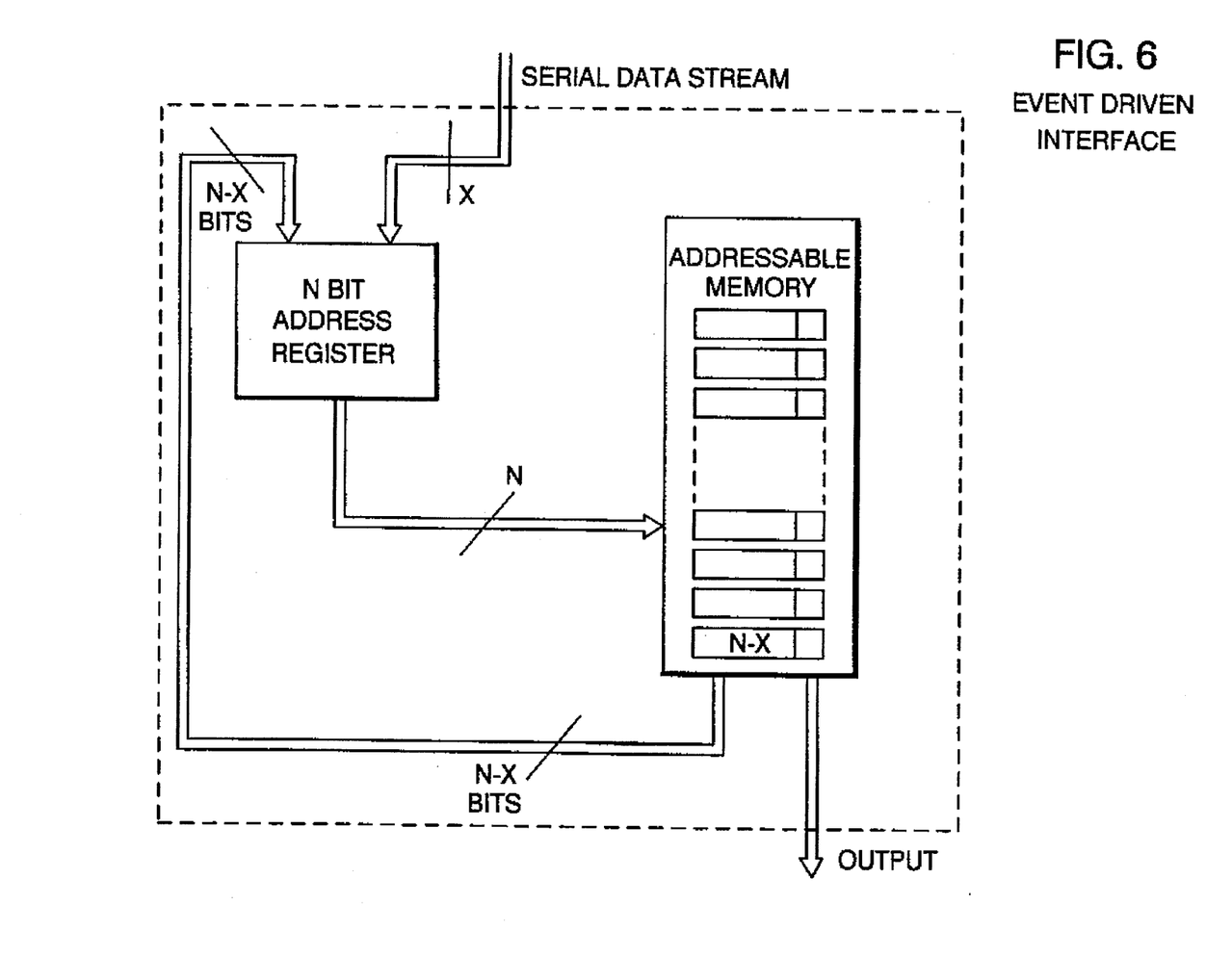
FIG. 6 shows an event driven interface (EDI) for use in a primary or standby processor.
Figure 7:
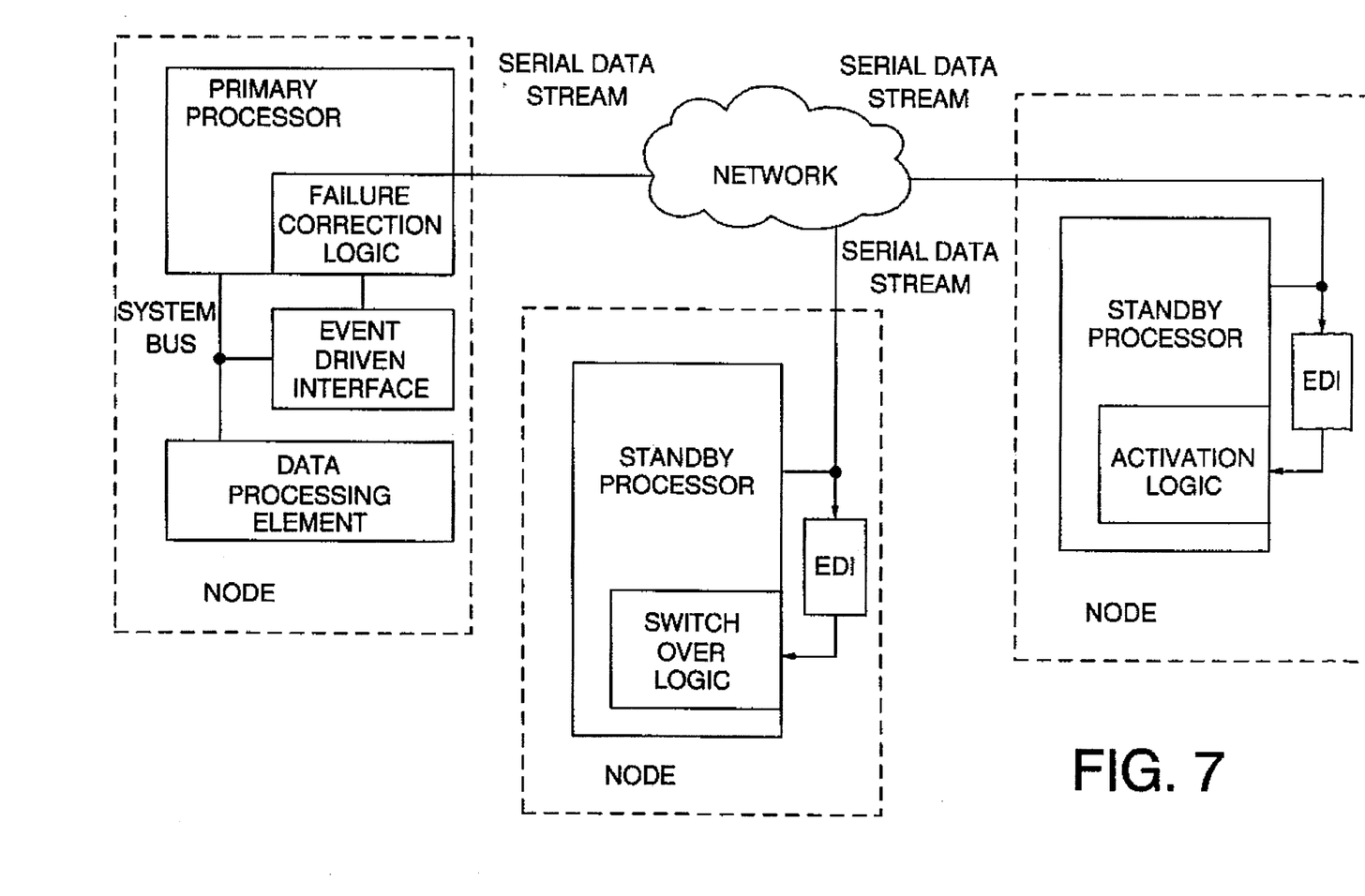
FIG. 7 shows the architecture for a high availability data processing system
Figure 8:
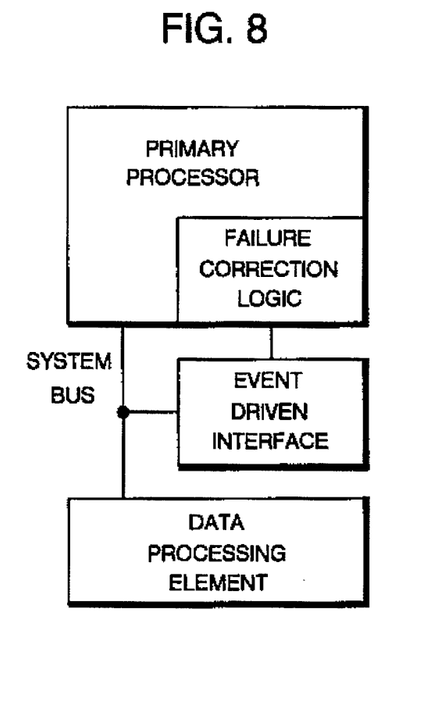
FIG. 8 shows a primary processor with fault correction logic.
Figure 9:
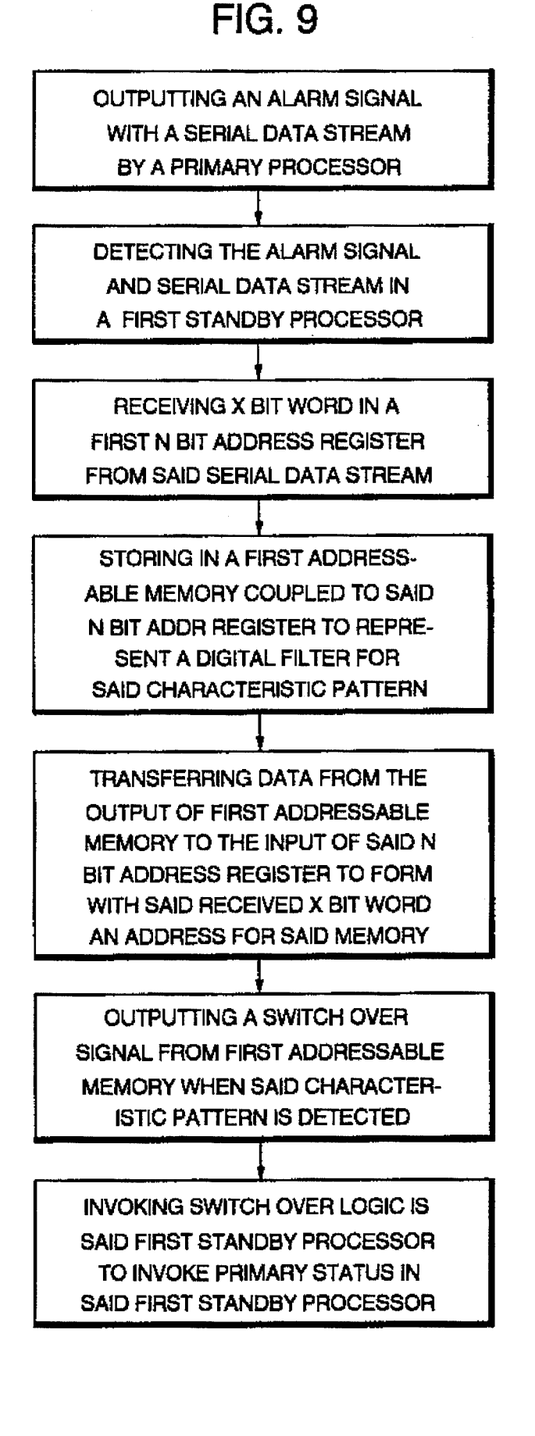
FIG. 9 shows the steps performed in switching from a primary to a standby processor.

In FIG. 5 we present an architecture for using the ICA to correct errors. The Address Latches operates accepts the input data from the channel as well as the feedback address bits output for the RAM lookup table. The RAM lookup table includes the error detection finite state machine as well as the error correction finite state machine. Consider the example of a simple error-correcting code consider a code with 4 valid code words:

0000000000   0001111000   1110000111   1111111111.

This code can correct two errors. If a symbol sequence arrives with a value of 1100000011, the finite state machine implemented within the RAM detects an error and outputs an error alarm. The RAM finite state machine then implements a decoder that decodes this word to the closest valid code word, (e.g., 1110000111). The error alarm signal is sent to control logic multiplexer (mux). If there is an error alarm, then the code word from the RAM is passed through the mux. If there is no error, then the original code word is passed through the mux.

REFERENCES

1. IBM Corp., Token-Ring Network Architecture Reference, Research Triangle Park, N.C., 1989.
2. IEEE, Inc., IEEE Standard 802.5, Token Ring Access Method, New York, N.Y., 1989.
3. Z.~Kohavi, Switching and Finite Automata Theory, McGraw-Hill, New York, N.Y., 1978.
4. IBM, RISC System/6000 Power Station and Power Server Hardware Technical Reference Micro Channel Architecture, Raleigh, N.C., 1990.

Although a specific embodiment of the invention has been disclosed, it will be understood by those having skill in the art that changes can be made to that specific embodiment without departing from the spirit and the scope of the invention.

What is claimed is:

1. A high availability data processing system, comprising:

a primary processor at a first node of a communications network with a serial data stream, having failure detection logic therein, for outputting an alarm signal to said communications network having a characteristic pattern indicating a failure in said primary processor;

a first standby processor at a second node of said communications network, having a first event driven interface therein coupled to said communications network, for detecting said alarm signal;

a first n-bit address register in said first event driven interface, having a first portion with n-x bits and a second portion with a plurality of x bits and an input of said second portion coupled to said serial data stream, for receiving x-bit words from said serial data stream;

a first addressable memory having a plurality of data storage locations, each having a first portion with n-x bits, said first addressable memory having an n-bit address input coupled to an output of said first n-bit address register, said first addressable memory configured with data stored in first and second ones of said plurality of data storage locations to represent a finite state machine for detection of said alarm signal, said second one of said plurality of data storage locations having a switch over signal valued stored therein;

a feedback path from an output of said first addressable memory to an input of said first n-bit address register, for transferring said data from said first one of said plurality of data storage locations in said first addressable memory to said first portion of said first n-bit address register, for concatenation with said x-bit words from said serial data stream to form an address for said plurality of data storage locations of said first addressable memory;

switch over logic in said first standby processor, coupled to said second one of said plurality of data storage locations, for invoking primary status in said first standby processor; and wherein said first addressable memory, said first n-bit address register cooperate via said feedback path to provide for detection of said alarm signal in said serial data stream such that said second one of said plurality of data storage locations of said first addressable memory outputs said switch over signal value when said alarm signal is present in said serial data stream, said switch over signal value causing said switch over logic to invoke primary status in said first standby processor.

2. The data processing system of claim 1, which further comprises:

a second standby processor at a third node of said communications network, having a second event driven interface therein coupled to said communications network, for detecting said alarm signal;

a second n-bit address register in said second event driven interface, having a first portion with n-x bits and a second portion with a plurality of x bits and an input of said second portion coupled to said serial data stream, for receiving x-bit words from said serial data stream;

a second addressable memory having a plurality of data storage locations, each having a first portion with n-x bits, said second addressable memory having an n-bit address input coupled to an output of said second n-bit address register, said second addressable memory configured with data stored in first and second ones of said plurality of data storage locations to represent a finite state machine for detection of said alarm signal, said second one of said plurality of data storage locations having a standby activation signal value stored therein;

a feedback path from an output of said second addressable memory to an input of said second n-bit address register, for transferring said data from said first one of said plurality of data storage locations in said second addressable memory to said first portion of said second n-bit address register, for concatenation with said x-bit words from said serial data stream to form an address for said plurality of data storage locations of said second addressable memory;

activation logic in said second standby processor, coupled to said second one of said plurality of data storage locations in said second addressable memory, for invoking hot standby status in said second standby processor; and wherein said second addressable memory, said second n-bit address register cooperate via said feedback path to provide for detection of said alarm signal in said serial data stream such that said second one of said plurality of data storage locations of said second addressable memory outputs said standby activation signal value when said alarm signal is present in said serial data stream, said output standby activation signal value causing said activation logic to invoke hot standby status in said second standby processor.

3. The data processing system of claim 1, wherein said primary processor includes a system bus coupled to a data processing element that outputs a failure signal to said system bus having a second characteristic pattern, indicating a failure in said data processing element, said primary processor further comprising:

a second event driven interface therein coupled to said system bus, for detecting said failure signal;

a second n-bit address register in said second event driven interface, having a first portion with n-x bits and a second portion with a plurality of x bits and an input of said second portion coupled to said system bus, for receiving x-bit words from said system bus;

a second addressable memory having a plurality of data storage locations, each having a first portion with n-x bits, said second addressable memory having an n-bit address input coupled to an output of said second n-bit address register, said second addressable memory configured with data stored in first and second ones of said plurality of data storage locations to represent a finite state machine for detection of said failure signal, said second one of said plurality of data storage locations having a failure detection signal value stored therein;

a feedback path from an output of said second addressable memory to an input of said second n-bit address register, for transferring said data from said first one of said plurality of data storage locations in said second addressable memory to said first portion of said second n-bit address register, for concatenation with said x-bit words from said serial data stream to form an address for said plurality of data storage locations of said second addressable memory;

a failure detection logic in said primary processor, coupled to said second one of said plurality of data storage locations in said second addressable memory, for transmitting said alarm signal to said communications network, in response to said failure detection signal value; and wherein said second addressable memory, said second n-bit address register cooperate via said feedback path to provide for detection of said failure signal in said system bus such that said second one of said plurality of data storage locations of said second addressable memory outputs said failure detection signal value when said failure signal is present in said system bus, said output failure detection signal value causing said failure detection logic to transmit said alarm signal to said communications network.

4. The data processing system of claim 3, which further comprises:

a failure correction logic in said primary processor, coupled to said second one of said plurality of data storage locations in said second addressable memory, for generating correction signals in response to said failure detection signal value, for correcting said failure in said data processing element.

5. A method for providing high availability in a data processing system, comprising:

outputting an alarm signal from a primary processor at a first node of a communications network with a serial data stream, said primary processor having failure detection logic therein, for said alarm signal sent to said communications network having a characteristic pattern indicating a failure in said primary processor;

detecting said alarm signal in a first standby processor at a second node of said communications network, having a first event driven interface therein coupled to said communications network, for detecting said alarm signal;

receiving x-bit words from said serial data stream in a second portion of a first n-bit address register of said first event driven interface, said first n-bit address register having a first portion with n-x bits and said second portion with a plurality of x bits;

storing in a first addressable memory having a plurality of data storage locations, each data storage location having a first portion with n-x bits, said first addressable memory having an n-bit address input coupled to an output of said first n-bit address register, said first addressable memory configured with data stored in a first and second ones of said plurality of data storage locations to represent a finite state machine for detection of said alarm signal, said second one of said plurality of data storage locations having a switch over signal value stored therein;

transferring in a feedback path from an output of said first addressable memory to an input of said first n-bit address register, said data from said first one of said plurality of data storage locations in said first addressable memory to said first portion of said first n-bit address register, for concatenation with said x-bit words from said serial data stream to form an address for said second one of said data storage locations of said first addressable memory;

outputting, from said second one of said plurality of data storage locations of said first addressable memory, the switch over signal value stored therein, when said alarm signal is detected in said serial data stream; and invoking with switch over logic in said first standby processor causing said first standby processor to go to primary status in response to said first event interface detecting said alarm signal.

* * * * *